United States Patent
Nelke et al.

(10) Patent No.: US 10,210,227 B2
(45) Date of Patent: Feb. 19, 2019

(54) PROCESSING A DATA SET

(71) Applicant: International Business Machines Corporation, Armonk, NY (US)

(72) Inventors: Sebastian Nelke, Frickenhausen (DE); Martin Oberhofer, Bondorf (DE); Yannick Saillet, Stuttgart (DE); Jens Seifert, Gaertringen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 551 days.

(21) Appl. No.: 14/710,668

(22) Filed: May 13, 2015

(65) Prior Publication Data

US 2015/0339360 A1 Nov. 26, 2015

(30) Foreign Application Priority Data

May 23, 2014 (GB) .................................. 1409214.2

(51) Int. Cl.
*G06F 17/30* (2006.01)
(52) U.S. Cl.
CPC .. *G06F 17/30563* (2013.01); *G06F 17/30303* (2013.01); *G06F 17/30955* (2013.01)
(58) Field of Classification Search
CPC ........................ G06F 17/30303; G06F 11/006
See application file for complete search history.

(56) References Cited

U.S. PATENT DOCUMENTS

| | | | | |
|---|---|---|---|---|
| 6,865,567 | B1* | 3/2005 | Oommen | G06F 17/30463 |
| 6,965,888 | B1* | 11/2005 | Cesare | G06F 17/30303 |
| | | | | 707/694 |
| 9,367,580 | B2* | 6/2016 | Gullin | G06F 11/3452 |
| 2004/0181512 | A1* | 9/2004 | Burdick | G06F 17/30371 |

(Continued)

FOREIGN PATENT DOCUMENTS

| | | |
|---|---|---|
| AU | 2013206466 | 7/2013 |
| WO | WO2013105440 | 7/2013 |

OTHER PUBLICATIONS

A. Borek, et al., "A Classification of Data Quality Assessment Methods," Proceedings of the 16th International Conference on Information Quality (ICIQ-11), Nov. 2011, 15 pages.

(Continued)

*Primary Examiner* — Robert W Beausoliel, Jr.
*Assistant Examiner* — Nirav K Khakhar
(74) *Attorney, Agent, or Firm* — Cantor Colburn LLP

(57) ABSTRACT

Embodiments relate to processing a data set stored in a computer system. In one aspect, a method of processing a data set stored in a computer system includes providing one or more parameters for quantifying data quality of the data set. A processor generates, for each parameter of the one or more parameters, a reference pattern indicating a dysfunctional behavior of the values of the parameter. The data set is processed to obtain values of the one or more parameters. A parameter of the one or more parameters is identified whose obtained values match a corresponding reference pattern of the generated reference patterns. The identified parameter is assigned a resource weight value indicating the amount of processing resources required to fix the dysfunctional behavior of the identified parameter.

17 Claims, 3 Drawing Sheets

(56) References Cited

U.S. PATENT DOCUMENTS

| | | | |
|---|---|---|---|
| 2005/0028046 A1* | 2/2005 | McArdle | G06F 17/30303 714/48 |
| 2005/0108631 A1 | 5/2005 | Amorin et al. | |
| 2008/0195430 A1 | 8/2008 | Rustagi | |
| 2010/0010979 A1* | 1/2010 | Garfinkle | G06F 17/30303 |
| 2010/0106724 A1 | 4/2010 | Anderson | |
| 2010/0257145 A1* | 10/2010 | Felsheim | G06F 17/30563 707/692 |
| 2012/0102002 A1* | 4/2012 | Sathyanarayana | G06F 17/30303 707/687 |
| 2012/0143913 A1* | 6/2012 | Beier | H03M 7/40 707/776 |
| 2012/0150825 A1 | 7/2012 | Chaturvedi et al. | |
| 2012/0197887 A1* | 8/2012 | Anderson | G06F 17/30321 707/736 |
| 2012/0330911 A1* | 12/2012 | Gruenheid | G06F 17/30303 707/694 |
| 2013/0031044 A1 | 1/2013 | Miranda et al. | |
| 2013/0054541 A1* | 2/2013 | Kaldas | G06F 17/30303 707/692 |
| 2013/0073594 A1 | 3/2013 | Jugulum et al. | |
| 2013/0086010 A1* | 4/2013 | Wenzel | G06F 11/0727 707/692 |
| 2013/0185309 A1 | 7/2013 | Bhide et al. | |
| 2014/0068395 A1 | 3/2014 | Zhang | |
| 2014/0108357 A1* | 4/2014 | Procops | G06F 17/30303 707/690 |
| 2014/0115013 A1 | 4/2014 | Anderson | |
| 2014/0324908 A1* | 10/2014 | Graham | G06F 17/30303 707/776 |
| 2015/0363437 A1* | 12/2015 | Florez | G06F 17/30303 707/692 |
| 2015/0379051 A1* | 12/2015 | Tang | G06F 17/30306 707/691 |
| 2016/0004743 A1* | 1/2016 | Tang | G06F 17/30371 707/691 |
| 2016/0034502 A1* | 2/2016 | Dupey | G06F 17/30303 707/688 |
| 2016/0070725 A1* | 3/2016 | Marrelli | G06F 17/30303 707/692 |
| 2016/0223702 A1* | 8/2016 | Hou | G01V 3/38 |
| 2016/0343080 A1* | 11/2016 | Weng | G06F 17/30303 |
| 2016/0364325 A1* | 12/2016 | Ouzzani | G06F 17/30303 |

OTHER PUBLICATIONS

E. Rahm, et al., "Data Cleaning: Problems and Current Approaches," Bulletin of the IEEE Computer Society Technical Committee on Data Engineering, Dec. 2000, 11 pages.

GB Application No. GB1409214.2 Search Report dated Nov. 7, 2014, 1 page.

S. Kandel, et al. "Profiler: Integrated Statistical Analysis and Visualization for Data Quality Assessment," AVI '12, May 21-25, 2012, 8 pages.

List of IBM Patents or Patent Applications Treated as Related, Nov. 29, 2018, 2 pages.

U.S. Appl. No. 16/203,682, filed Nov. 29, 2018, Entitled: Processing a Data Set, First Named Inventor: Sebastian Nelke.

* cited by examiner

PROCESSING A DATA SET

BACKGROUND

Embodiments of the invention relate generally to computing systems, and more particularly to processing a data set stored in a computer system.

Data profiling is a mandatory step in all types of information integration projects such as data warehousing (DW), master data management (MDM) or application consolidation. The purpose of data profiling is to assess data quality of data residing in source systems before loading it into target systems.

In some projects, source systems may comprise over 70,000 tables containing several terabytes of data without any documentation. Running the data profiling, for example, of 6000 tables, as well as understanding and assessing the profiling result reports (PRRs) can last weeks or months. Even if full weeks or months would have been available to process the results, assuming the analysis would have not required any time in this case, this would have not been possible because there would not be enough resources to assess and classify the PRRs within the given timeframe. This is due to the fact that each of the PRRs has to be evaluated to be sure not to miss quality problems. In such a project there are simply not enough resources available for cost reasons to review 6,000+ PRRs. In addition, with extreme time pressure assessing PRRs, the probability for critical errors increases, which can cause load failures or broken processes later in the information integration project due to unhandled data quality issues.

SUMMARY

Embodiments relate to methods, systems, and computer program products for processing a data set. In one aspect, a method of processing a data set stored in a computer system includes providing one or more parameters for quantifying data quality of the data set. A processor generates, for each parameter of the one or more parameters, a reference pattern indicating a dysfunctional behavior of the values of the parameter. The data set is processed to obtain values of the one or more parameters. A parameter of the one or more parameters is identified whose obtained values match a corresponding reference pattern of the generated reference patterns. The identified parameter is assigned a resource weight value indicating the amount of processing resources required to fix the dysfunctional behavior of the identified parameter.

According to another aspect, a computer program product for processing a data set stored in a computer system is provided. The computer program product includes a computer readable storage medium having program instructions embodied therewith. The program instructions are executable by a processor to cause the processor to provide one or more parameters for quantifying data quality of the data set. The processor generates, for each parameter of the one or more parameters, a reference pattern indicating a dysfunctional behavior of the values of the parameter. The data set is processed to obtain values of the one or more parameters. A parameter of the one or more parameters is identified whose obtained values match a corresponding reference pattern of the generated reference patterns. The identified parameter is assigned a resource weight value indicating the amount of processing resources required to fix the dysfunctional behavior of the identified parameter.

According to a further aspect, a computer system for processing a data set stored in the computer system is provided. One or more parameters for quantifying data quality of the data set are provided. The computer system includes a memory having computer readable instructions and one or more processors for executing the computer readable instructions. The computer readable instructions provide one or more parameters for quantifying data quality of the data set. The one or more processors generate, for each parameter of the one or more parameters, a reference pattern indicating a dysfunctional behavior of the values of the parameter. The data set is processed to obtain values of the one or more parameters. A parameter of the one or more parameters is identified whose obtained values match a corresponding reference pattern of the generated reference patterns. The identified parameter is assigned a resource weight value indicating the amount of processing resources required to fix the dysfunctional behavior of the identified parameter.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
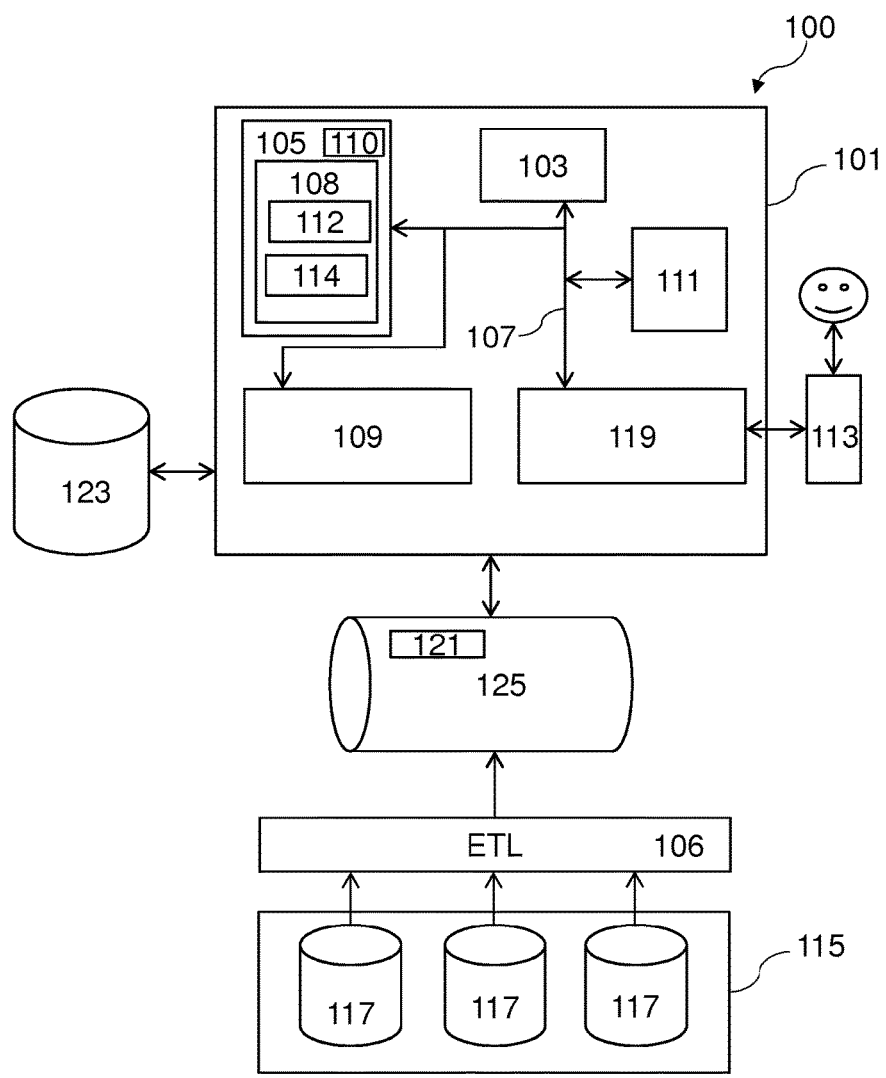
FIG. 1 illustrates an exemplary computer system for processing a data set.

In the following, like numbered elements in the figures either designate similar elements or designate elements that perform an equivalent function. Elements which have been discussed previously will not necessarily be discussed in later figures if the function is equivalent.

The term "data pattern" or "pattern" as used herein refers to any kind of relationship, form, template, model or a set of rules which can be used to describe correlations and/or behaviors by which individual values of the data set are linked or how individual or combination of values behave, e.g., over time or compared to thresholds. For example, the data pattern may comprise a condition (such as a range of validity) on a value or a combination of values of the data set.

The term "data quality" as used herein refers to data accuracy for which data values in the data meet a predefined acceptability level based, e.g., on user defined criteria, such as type of data, etc.

For example, the computer system and/or the data set may be configured to fix dysfunctional behavior. Fixing the dysfunctional behavior may comprise configuring the computer system and/or the data set such that the identified parameter values in the configured computer system/data set may not match the corresponding pattern.

The generated reference patterns may be stored in a library of the computer system.

The generated reference patterns may comprise a noise pattern that may result from a random process that appears in conjunction with a systematic process without meaning in the computer system. The noise pattern may also comprise a pattern associated with corrupt data or any pattern that cannot be read or used by a program.

The data processing may be, for example, extraction, transformation, and loading (ETL) processing and/or data mining.

ETL processing involves the extraction of data from a database, the transformation of that data into a structure that is appropriate for analysis and loading the data into target tables.

The steps of processing the data set, identifying the parameter and assigning the resource weight value may be automatically executed.

The features of the disclosed method may have the advantage of providing an automatic method that may save resources in the computer system that would be otherwise required for running an ad-hoc (e.g., a user processed) identification of the data quality problems in the data set. For example, the usage of reference patterns may allow the comparison of multiple values in a column with the reference pattern. This is in contrast to a conventional method of checking individual values of the columns.

Another advantage may reside in the fact that the present method may increase the performance of the computer system by reducing the processing time of the data set, e.g., by saving the time of an ad-hoc monitoring of the data quality problems, as it is the case in the contemporary art.

Another advantage may be that the present method may be less error prone compared to the ad-hoc contemporary art method.

According to one embodiment, a parameter of the one or more parameters comprises at least one of or a combination of at least two of: a fraction (i.e., relative frequency of occurrence) of each distinct value in a column of a predefined data set; a fraction of each distinct value format in a column of the predefined data set; a fraction of each non-null distinct value in a column of the predefined data set; a fraction of each distinct inferred type of values in a column of the predefined data set; meta-data of data values of the predefined data set; a correlation factor indicating the correlation of the content of at least two columns of the predefined data set.

The meta-data may comprise a minimum, maximum, mean, mode, percentile, standard deviation, count, and sum of predefined values, data type, length, occurrence of null values.

This embodiment may be advantageous as it may provide an accurate and reliable method for detecting and classifying data quality problems in the data set.

According to one embodiment, generating a reference pattern for the fraction of a distinct value format comprises: providing a reference data set; sorting the distinct value formats, in a column of the reference data set, by their fraction; selecting the distinct value formats whose fraction is higher than a predetermined format threshold value; computing the mean and standard deviation of the fractions of the selected distinct value formats; generating the reference pattern using the fractions below the calculated mean minus two times the standard deviation.

According to one embodiment, generating a reference pattern for the fraction of a distinct value comprises: providing a reference data set; sorting the distinct values, in a column of the reference data set, by their fraction; selecting the distinct values whose fraction is smaller than a predetermine fraction threshold value; computing the mean and standard deviation of the fractions of the selected distinct values; generating the reference pattern using the fractions above the calculated mean plus two times the standard deviation.

Using a reference data set that may be different from the data set to be analyzed may prevent biased results in the detection of the data quality problems. It may also provide a uniform data quality problem classification based on patterns generated using the same reference data set.

According to one embodiment, identifying the parameter comprises determining that a column in the data set is containing at least one distinct value whose fraction is at least two standard deviations higher than the mean.

According to one embodiment, the reference data set comprises the data set. This may be advantageous as it may save resources that would otherwise be required to store a reference data set which is different from the data set.

According to one embodiment, identifying the parameter comprises determining that a column of a table in the data set is containing a ratio of the number of non-null distinct values divided and the number of rows of the table that is above a predefined threshold, wherein the predefined threshold is in the interval [0.95-1].

According to one embodiment, the method further comprises providing a set of algorithms for processing the data set, wherein the data set is processed using at least one algorithm of the set of algorithms.

According to one embodiment, the resource weight value is an averaged weighed value computed using the number of rows and columns in the data set containing parameter values that match a reference pattern of the generated reference patterns. This may provide an accurate estimation of the required processing resources.

According to one embodiment, the method further comprises outputting to a user of the computer system the identified parameter and the resource weight value.

The method may further comprise receiving a request from the user to fix the dysfunctional behavior. In another example, the method may further comprise receiving a request to recalculate the resource weight value using input data from the user.

According to one embodiment, the resource weight value is determined using the at least one algorithm and the reference pattern corresponding to the identified parameter. For example, a test analysis may be performed when providing the reference patterns. The test analysis may run at least one of the selected algorithms on a predefined test data set in order to estimate the amount of resources that are required to fix the dysfunctional behavior of one of the generated reference patterns.

According to one embodiment, the data set comprises a set of data tables, wherein processing of the data set comprises: providing a set of table categories for tables in the computer system; providing a set of metrics, each metric comprising a respective characteristic metric for each table category; for each table of the set of the data tables: evaluating the set of metrics; analyzing the evaluated set of metrics; categorizing the table into one of the set of table categories using the result of the analysis; outputting information indicative of the table category of each table of the set of tables; in response to the outputting receiving a request to select data tables of the set of data tables according to a part of the table categories for data processing; and selecting a subset of data tables of the set of data tables using the table categories for performing the data processing on the subset of data tables.

This embodiment may be advantageous, as it may speed up the data processing by eliminating the time required to analyze irrelevant data tables. The present method may, thus, be applied to data integration systems having a limited time window for processing terabytes of data.

Also, the purpose of this embodiment may be to improve the probability to provide PRRs related to the most critical data quality problems which are detected only for relevant data tables.

According to one embodiment, providing a metric for a given table category comprises: generating multiple probe tables having the given table category; determining the metric for said table category using characteristics of the multiple tables; defining one or more threshold values associated with the metric for characterizing said table category, wherein the metric is determined using at least one of characteristics of a table: read access rate; insert, delete and update rates; number of records; number of columns; number of primary key and foreign key relationships; volume throughput for an ETL process; timestamp value; assigned trigger type.

These embodiments may be advantageous as they may provide an accurate and reliable method for classifying the data tables based on multiple table characteristics.

FIG. 1 depicts an exemplary architecture of a computer system 100 for data profiling. For example, the computer system 100 may be part of a zEnterprise system of IBM® comprising an IBM DB2 database system.

An Extract-Transform-Load (ETL) module 106 may extract data from source databases 117 of a database infrastructure 115 and push the data into a staging area 125 for analysis. The source databases 117 may store data or operational information of a user, e.g., in unstructured text and/or structured data that are input into the system.

Connected to the staging area 125 is a computer device 101, which may also be referred to as a system. The components of computer device 101 may include, but are not limited to, one or more processors or processing units 103, a storage system 111, a memory system 105, and a bus 107 that couples various system components including memory system 105 to processor 103. Memory system 105 may include computer system readable media in the form of volatile memory, such as random access memory (RAM) and/or cache memory.

Computer device 101 typically includes a variety of computer system readable media. Such media may be any available media that is accessible by computer device 101, and it includes both volatile and non-volatile media, removable and non-removable media.

Computer device 101 may also communicate with one or more external devices, such as a keyboard, a pointing device, a display 113, etc.; one or more devices that enable a user to interact with computer device 101; and/or any devices (e.g., network card, modem, etc.) that enable computer device 101 to communicate with one or more other computing devices. Such communication can occur via I/O interface(s) 119. Still yet, computer device 101 can communicate with one or more networks such as a local area network (LAN), a general wide area network (WAN), and/or a public network (e.g., the internet) via network adapter 109. As depicted, network adapter 109 communicates with the other components of computer device 101 via bus 107.

Memory system 105 is configured to store a plurality of applications that are executable on the processor 103. For example, the memory system 105 may comprise an operating system as well as application programs.

The application programs comprise a data profiler 108. The data profiler 108 comprises a data quality problem detection engine 112 and data quality problem classifier 114.

The data set 121 in the staging area 125 may be processed for analysis using the data profiler 108 which stores the results in a profiling database, e.g., in storage system 111. The computer device 101 may act as a database management system (e.g., IBM DB2) connected to the staging area 125.

Memory system 105 may further comprise a data quality classification viewer 110 for displaying the outputs of the data profiler 108 to a user of the computer system 100.

The computer system 100 further comprises a data quality pattern library 123. The data quality pattern library 123 may store reference data patterns as obtained by the method described below. It may also include metadata which is used to determine the priority of each data quality issue (i.e., reference data patterns) per data source, e.g. source databases 117, or overall data sources of the database infrastructure 115.

The operation of the computer system 100 will be described in details with reference to FIG. 2.

Figure 2:
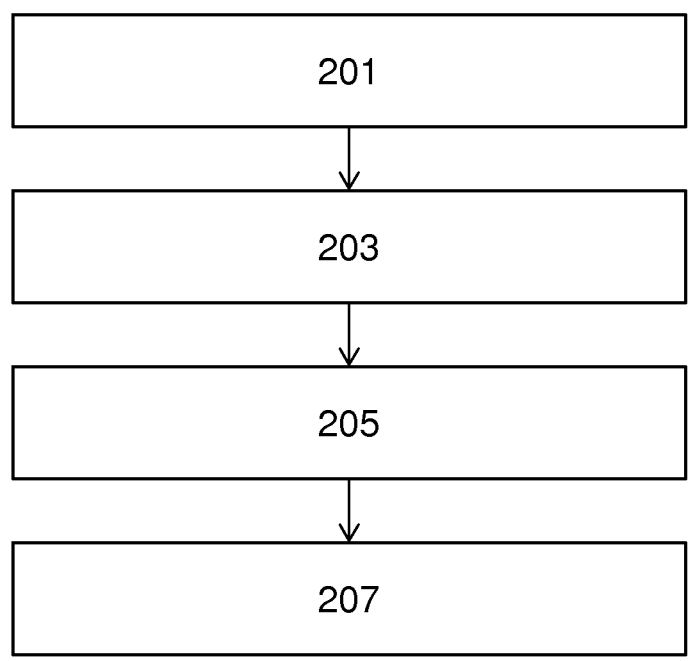
FIG. 2 is a flowchart of a method for processing a data set.

FIG. 2 is a flowchart of a method for processing the data set 121 stored in the staging area 125. The data quality of the data set 121 may be quantified using one or more parameters. For example, a parameter of the one or more parameters may comprise a fraction of each distinct value in a column of the data set and/or a fraction of each distinct value format in the column of the predefined data set. The data set may be, for example, the result of a profiling task.

In block 201, the data quality problem detection engine 112 may generate for each parameter of the one or more parameters a reference pattern indicating a dysfunctional behavior of the values of the parameter. For example, starting from a reference data set, the data quality problem detection engine 112 may sort the distinct value formats, in a column of the reference data set, by their fraction, i.e., a relative frequency of occurrence. For instance, a column may contain float, integer and string formats, each of them occurs a certain number of times, the relative frequency of occurrence may be equal to that number of times divided by the number entries in that column. The data quality problem detection engine 112 may select the distinct value formats whose fraction is higher than a predetermined format threshold value (e.g., 30%) and compute the mean and standard deviation of the fractions of the selected distinct value formats. Using the calculated mean and standard deviation, the data quality problem detection engine 112 may generate the reference pattern using the fractions below the calculated mean by at least two standard deviations.

In block 203, the data quality problem detection engine 112 may process the data set 121 for obtaining values of the one or more parameters. For example, the data set 121 may comprise a data table having columns and rows. The data quality problem detection engine 112 may access each column and row and calculate the values of the one or more parameters, e.g., for a given column it may calculate the frequency of occurrence of the distinct values in that column.

In block 205, the data quality problem detection engine 112 may identify a parameter of the one or more parameters whose obtained values match a corresponding reference pattern of the generated reference patterns. For example, the data quality problem detection engine 112 may access the data quality pattern library 123 to retrieve the reference patterns and compare each of the retrieved patterns with the obtained values of the one or more parameters. For example, for a parameter being the fraction of each distinct value format in a column, the data quality problem detection engine 112 may compare the obtained values for the fraction of each distinct value format in each column of a data table of the data set 121 with the mean and the standard deviation calculated above. If that fraction is at least two standard deviations higher than the mean, the parameter "fraction of each distinct value format in a column" may be identified as a source of data quality problem in the data set 121.

In block 207, data quality problem classifier 114 may assign to the identified parameter a resource weight value indicating the amount of processing resources required to fix the dysfunctional behavior of the identified parameter. For example, in case the data set comprises a data table for which a data quality problem has been detected by the data quality problem detection engine 112, the resource weight value may be estimated or calculated using the number of entries in the table and the amount of physical resources, e.g., CPU resources required to process the entries in order to fix the dysfunctional behavior.

The method may further comprise classifying the identified parameters based on the priorities of the corresponding reference data patterns stored in the data quality pattern library 123, e.g., such that the user can decide which data quality problem to fix first. This may be triggered by reception of a request from the user.

As soon as the assignment is performed, the data quality classification viewer 110 may provide to the user, e.g., by displaying using the external device 113, the identified parameters as well as the corresponding resource weight values and may request a selection of at least part of the identified parameters in order to fix their dysfunctional behaviors.

In the following, details of the resource weight values calculation will be provided for different types of dysfunctional behaviors. The data set 121 may comprise a data table having columns and rows.

Uniqueness Violations:

The values of some columns (e.g., Primary Key, PK, columns) are supposed to be unique; however, it may happen that some values are not unique. In order to detect this problem, for each analyzed column of these columns supposed to contain unique values only of the data table, the data quality problem detection engine 112 may compute values for the parameter cardinality as follows cardinality=number of distinct non null values/number of non-null values in the column. In the data quality pattern library 123, a reference pattern corresponding to the parameter cardinality indicates that values in the range cardinality<1.0 and cardinality>threshold (where threshold is close to 1.0, for instance, 0.95), indicate a dysfunctional behavior of the cardinality that causes the uniqueness violation.

The data quality problem classifier 114 may estimate the resource weight value for the parameter cardinality as follows. Resource weight value=Number of duplicate values multiplied by a resource amount to fix one duplicate value, where Number of duplicate values=(1.0-cardinality) multiplied by the number of non-null values. The resource amount may be a physical resource amount of the computer system 100 necessary to fix one duplicate value. For example, the physical resource amount may indicate the use degree of each of the physical components, such as CPU, memory, and network bandwidth included in the computer system 100.

Unexpected Values/Format Violations:

A column contains some values whose format does not match with the expected format. For example, a column is supposed to contain phone numbers but some values are email addresses or non-relevant strings. In this case, the parameter is the format of each value in a column of the data table. The reference pattern may comprise a predetermined list of unexpected formats and their frequency of occurrence.

To detect this data quality problem, the data quality problem detection engine 112 may sort, for each column of the data table, the format distribution (list of distinct formats and their frequency) by their frequency of occurrence. The data quality problem detection engine 112 may split the sorted distribution in two groups: one group containing the N most frequent formats representing X% of all values, where X is a threshold close to 100% (ex: 95%), and one group containing the other less frequent formats. Data quality problem detection engine 112 may then compute the mean and standard deviation (stddev) of the frequencies of the formats from the group of the most frequent formats, and a limit L=mean minus two times stddev. The data quality problem detection engine 112 may check for each format in the group of less frequent format if its frequency is <L. A format whose frequency is below this limit is an outlier and can be an indicator of a format violation.

The data quality problem classifier 114 may estimate the resource weight value to fix this problem as follows: resource weight value=Number of values to fix multiplied by a resource amount to fix one value, where the number of values to fix is the sum of frequencies of all formats whose frequency is <L. The resource amount may be a physical resource amount of the computer system 100 necessary to fix one value. For example, it may indicate the use degree of each of the physical components such as CPU, memory, and network bandwidth included in the computer system 100.

Unexpected Values/Invalid Categorical Value:

A column should contain a limited list of defined categorical values (ex: Gender=M or F), but some of the values found in the column may be invalid.

A heuristic to detect this data quality problem is similar to the detection of invalid formats but is done on the frequency distribution of the values. In this case, the data quality problem detection engine 112 may sort, for each column, the value frequency distribution (list of distinct values and their frequency) by their frequency of occurrence. The data quality problem detection engine 112 may split the sorted distribution in two groups: one group containing the N most frequent values representing X% of all values, where X is a threshold close to 100% (ex: 95%), and one group containing the other less frequent values. The data quality problem detection engine 112 may then compute the mean and standard deviation (stddev) of the frequencies of the values from the group of the most frequent values, and a limit L=mean minus two times stddev. The data quality problem detection engine 112 may check for each value in the group of less frequent values if its frequency is <L. A value whose frequency is below this limit is an outlier and can be an indicator of an invalid value.

Out of Range Numeric or Temporal Values:

A numeric or temporal column of the data table may contain some values which are potentially out of a predefined range. To detect this data quality problem, the data quality problem detection engine 112 may check, for each numeric or temporal column, if a value<mean−2*stddev or value>mean+2*stddev, where mean and stddev is the mean and the standard deviation of the distribution of numerical or temporal values in the column. If one of the two conditions is true, this may be an indication for out of range values.

Non-standardized Missing Values:

A column is allowed to contain null values; however, the representation of null values is not standardized (e.g., some rows contain a "null" value, but for other rows an empty string"", or "−" is used to indicate the null value). As the column is allowed to contain null values, the "nullable" flag must be set in the table's column definition.

Non-standardized missing values are often visible when looking at the frequency distribution of a column when a few values are over represented compared to other values (e.g., most values appear at most ten times, but three values appear several hundreds of thousands times). To detect this pattern programmatically, an algorithm similar to the detection of invalid categorical values can be used with the difference that the search is done for outliers with an unusual high frequency.

The data quality problem detection engine 112 may sort, for each column of the data table, the value frequency distribution (list of distinct values and their frequency) by their frequency of occurrence. The data quality problem detection engine 112 may split the sorted distribution in two groups: one group containing the N less frequent values representing X% of all values, where X is a threshold close to 100% (ex: 95%), and one group containing the other values with the highest frequencies. The data quality problem detection engine 112 may then compute the mean and standard deviation (stddev) of the frequencies of the values from the larger group of the less frequent values, and a limit L=mean+2*stddev. The data quality problem detection engine 112 may check for each value in the smaller group of values with higher frequency if its frequency is >L. A value whose frequency is above this limit and which does not correspond to the expected representation of a missing value is an outlier and may be an indicator of an unstandarized missing value.

Data Types Mismatch:

The data table of the data set 121 may be a source data table of the source databases 117. For example, an ETL job of the ETL 106 may move the content of the source data table to the target data table. A target data table may contain the same fields as the source data table but it may contain different values or reference values for attributes in a given same field. If there is a source to target mapping function, it can be checked for each mapped column in the source data table if the source values can fit in the target column, or if some values are for instance too long to be successfully loaded in the target. This check can be done by comparing the inferred type of the source with the defined type of the target.

If there is no source to target mapping function, the inferred type of each column can still be compared with its defined type.

A data quality problem may, for example, occur if the type of the source value may not fit with its defined type in the target table. A possible data quality problem due to data type mismatch may also be detected if it is found that in a column a large majority of values have a certain inferred type or length, but a small minority of values has a different inferred type. For example, in string columns 99% of the values could be parsed as a date in the format YYYY-MM-DD, but 1% of the values are strings which can't be parsed as a date. Those 1% values are suspect and are potentially invalid values.

Figure 3:
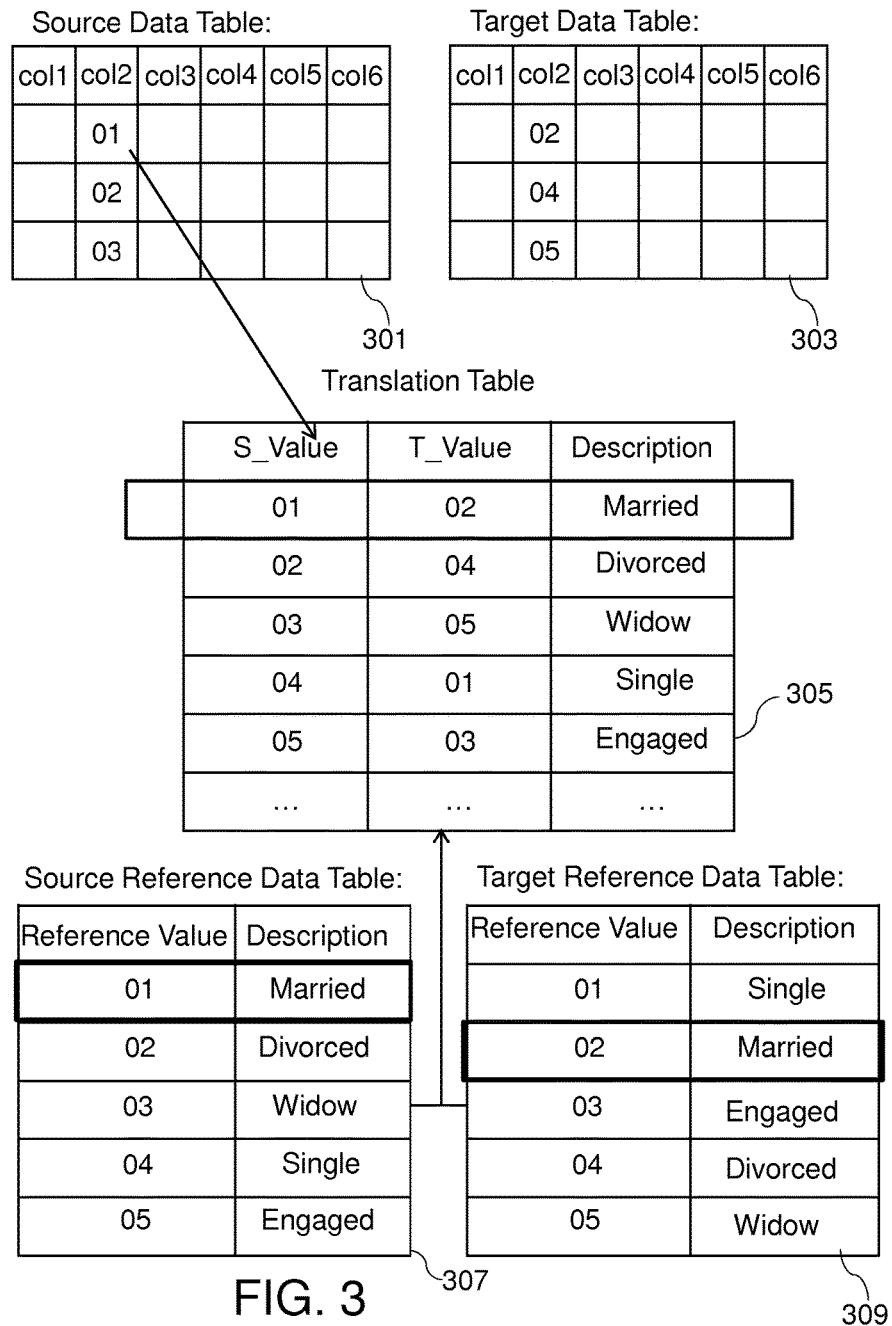
FIG. 3 shows source and target data tables of a computer system.

Domain Analysis (Data Reference Harmonization Problem, A.K.A. Data Validity):

For example, it may happen as illustrated in FIG. 3 that a source data table 301 having reference values 307 in a field or column (e.g., for marital status) is different from reference values 309 in the same field or column in the target data table 303. In source table 301, it is shown that the status "Married" has a reference value 1, while for the same "Married" status a reference value of 2 is given in the target table 303.

This may be detected by the data quality problem detection engine 112 by, e.g., comparing the two source and target data tables. The reference pattern may indicate that reference values in the source data tables are different from reference values in the target data tables.

This means if data from that source table 301 is moved from a source system to a target system, reference data harmonization has to occur. This is done using a mapping table 305 as shown in FIG. 3. When data is moved, the ETL job moving the source records to the target replaces for each source reference value found, the value with the corresponding reference value of the target with a lookup against the defined mapping table 305 for the field backed by reference data. Thus, the more replacement rules need to be setup, the more labor-intensive the resolution of this task becomes.

For multiple sources there are two observations relevant for resource weight value calculation.

The comparison between source and target system can be done by unique data pair of source-target. However, not each source might have unique reference data, i.e., there might be some reference data used in more than one source system. For reference data used across multiple source systems, the mapping rule used for one source system may be re-used across other source systems as well reducing the resource usage.

For the estimation of a resource weight value for the reference data mappings, the data quality problem classifier 114 may execute the following. Establish a distinct count on unique reference data values across sources creating the source reference value set (SRVS) which need to be mapped. This includes finding the distinct values also an inclusion of the description values. The SRVS is intersected with the reference data value set of the target table.

A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider).

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. The amount of processing resources may indicate the use degree of each of the physical components such as CPU, memory, and N/W bandwidth included in the computer system and their money cost. It is further under stood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

It is understood that one or more of the aforementioned embodiments may be combined as long as the combined embodiments are not mutually exclusive.

What is claimed is:

1. A method of processing a data set stored in a computer system, the method comprising:
   providing one or more parameters for quantifying data quality of the data set, wherein the data set comprises a set of data tables;
   generating, by a processor, for each parameter of the one or more parameters, a reference pattern comprising a set of rules indicating a dysfunctional behavior of the values of the parameter;
   processing the data set to obtain values of the one or more parameters, the processing comprising:
     providing a set of table categories for tables in the computer system;
     providing a set of metrics, each metric comprising a respective characteristic metric for each table category;
     for each table of the set of the data tables:
       evaluating the set of metrics;
       analyzing the evaluated set of metrics; and
       categorizing the table into one of the set of table categories using the result of the analysis;
     outputting information indicative of the table category of each table of the set of tables;

in response to the outputting, receiving a request to select data tables of the set of data tables according to a part of the table categories for data processing; and selecting a subset of data tables of the set of data tables using the table categories for performing the data processing on the subset of data tables;

identifying a parameter of the one or more parameters whose obtained values match a corresponding reference pattern of the generated reference patterns;

assigning to the identified parameter a resource weight value indicating the amount of processing resources required to fix the dysfunctional behavior of the identified parameter; and initiating a process to fix the dysfunctional behavior of the identified parameter using the amount of processing resources of the computer system responsive to a user request, thereby increasing performance of the computer system by reducing processing time of the data set attributed to ad-hoc monitoring of data quality problems.

2. The method of claim 1, wherein a parameter of the one or more parameters comprises at least one of or a combination of at least two of:

a fraction of each distinct value in a column of a predefined data set;

a fraction of each distinct value format in a column of the predefined data set;

a fraction of each non-null distinct value in a column of the predefined data set;

a fraction of each distinct inferred type of values in a column of the predefined data set;

meta-data of data values of the predefined data set; and a correlation factor indicating a correlation of content of at least two columns of the predefined data set.

3. The method of claim 2, wherein generating a reference pattern for the fraction of a distinct value format comprises:

providing a reference data set;

sorting the distinct value formats, in a column of the reference data set, by the fraction;

selecting the distinct value formats whose fraction is higher than a predetermined format threshold value;

computing the mean and standard deviation of the fractions of the selected distinct value formats; and generating the reference pattern using the fractions below the calculated mean by at least two standard deviations.

4. The method of claim 2, wherein generating a reference pattern for the fraction of a distinct value comprises:

providing a reference data set;

sorting the distinct values, in a column of the reference data set, by the fraction;

selecting the distinct values whose fraction is smaller than a predetermine fraction threshold value;

computing the mean and standard deviation of the fractions of the selected distinct values; and generating the reference pattern using the fractions above the calculated mean by at least two standard deviations.

5. The method of claim 4, wherein identifying comprises determining that a column in the data set contains at least one distinct value whose fraction is at least two standard deviations higher than the mean.

6. The method of claim 4, wherein the reference data set comprises the data set.

7. The method of claim 2, wherein identifying comprises determining that a column of a table in the data set is containing a ratio of the number of non-null distinct values and the number of rows of the table that is above a predefined threshold, wherein the predefined threshold is in an interval between 0.95 and 1.

8. The method of claim 1, further comprising providing a set of algorithms for processing the data set, wherein the data set is processed using at least one algorithm of the set of algorithms.

9. The method of claim 1, wherein the resource weight value is an averaged weighed value computed using the number of rows and columns in the data set containing parameter values that match a reference pattern of the generated reference patterns.

10. The method of claim 1, further comprising outputting to a user of the computer system the identified parameter and the resource weight value.

11. The method of claim 8, wherein the resource weight value is determined using the at least one algorithm and the reference pattern corresponding to the identified parameter.

12. The method of claim 1, wherein providing a metric for a given table category comprises:

generating multiple probe tables having the given table category;

determining the metric for the table category using characteristics of the multiple tables; and defining one or more threshold values associated with the metric for characterizing the table category, wherein the metric is determined using at least one of characteristics of a table comprising:

a read access rate;

insert, delete and update rates;

a number of records;

a number of columns;

a number of primary key and foreign key relationships;

a volume throughput for an extraction, transformation, and loading (ETL) process;

a timestamp value; and an assigned trigger type.

13. A computer program product for processing a data set stored in a computer system, the computer program product comprising a non-transitory computer readable storage medium having program instructions embodied therewith, the program instructions executable by a processor to cause the processor to:

provide one or more parameters for quantifying data quality of the data set, wherein the data set comprises a set of data tables;

generate for each parameter of the one or more parameters, a reference pattern comprising a set of rules indicating a dysfunctional behavior of the values of the parameter;

process the data set to obtain values of the one or more parameters, the process comprising:

providing a set of table categories for tables in the computer system;

providing a set of metrics, each metric comprising a respective characteristic metric for each table category;

for each table of the set of the data tables:

evaluating the set of metrics;

analyzing the evaluated set of metrics; and categorizing the table into one of the set of table categories using the result of the analysis;

outputting information indicative of the table category of each table of the set of tables;

in response to the outputting, receiving a request to select data tables of the set of data tables according to a part of the table categories for data processing; and selecting a subset of data tables of the set of data tables using the table categories for performing the data processing on the subset of data tables;

identify a parameter of the one or more parameters whose obtained values match a corresponding reference pattern of the generated reference patterns;

assign to the identified parameter a resource weight value indicating the amount of processing resources required to fix the dysfunctional behavior of the identified parameter; and initiate a process to fix the dysfunctional behavior of the identified parameter using the amount of processing resources of the computer system responsive to a user request, thereby increasing performance of the computer system by reducing processing time of the data set attributed to ad-hoc monitoring of data quality problems.

14. The computer program product of claim 13, wherein a parameter of the one or more parameters comprises at least one of or a combination of at least two of:
   a fraction of each distinct value in a column of a predefined data set;
   a fraction of each distinct value format in a column of the predefined data set;
   a fraction of each non-null distinct value in a column of the predefined data set;
   a fraction of each distinct inferred type of values in a column of the predefined data set;
   meta-data of data values of the predefined data set; and
   a correlation factor indicating a correlation of content of at least two columns of the predefined data set.

15. A computer system for processing a data set stored in the computer system, wherein one or more parameters for quantifying data quality of the data set are provided, the computer system comprising:
   a memory having computer readable instructions; and
   one or more processors for executing the computer readable instructions, the computer readable instructions comprising:
      providing one or more parameters for quantifying data quality of the data set, wherein the data set comprises a set of data tables;
      generating for each parameter of the one or more parameters, a reference pattern comprising a set of rules indicating a dysfunctional behavior of the values of the parameter;
      processing the data set to obtain values of the one or more parameters, the processing comprising:
         providing a set of table categories for tables in the computer system;
         providing a set of metrics, each metric comprising a respective characteristic metric for each table category;
         for each table of the set of the data tables:
            evaluating the set of metrics;
            analyzing the evaluated set of metrics; and
            categorizing the table into one of the set of table categories using the result of the analysis;
         outputting information indicative of the table category of each table of the set of tables;
         in response to the outputting, receiving a request to select data tables of the set of data tables according to a part of the table categories for data processing; and
         selecting a subset of data tables of the set of data tables using the table categories for performing the data processing on the subset of data tables;
      identifying a parameter of the one or more parameters whose obtained values match a corresponding reference pattern of the generated reference patterns;
      assigning to the identified parameter a resource weight value indicating the amount of processing resources required to fix the dysfunctional behavior of the identified parameter; and
      initiating a process to fix the dysfunctional behavior of the identified parameter using the amount of processing resources of the computer system responsive to a user request, thereby increasing performance of the computer system by reducing processing time of the data set attributed to ad-hoc monitoring of data quality problems.

16. The computer system of claim 15, wherein a parameter of the one or more parameters comprises at least one of or a combination of at least two of:
   a fraction of each distinct value in a column of a predefined data set;
   a fraction of each distinct value format in a column of the predefined data set;
   a fraction of each non-null distinct value in a column of the predefined data set;
   a fraction of each distinct inferred type of values in a column of the predefined data set;
   meta-data of data values of the predefined data set; and
   a correlation factor indicating a correlation of content of at least two columns of the predefined data set.

17. The computer system of claim 15, wherein providing a metric for a given table category comprises:
   generating multiple probe tables having the given table category;
   determining the metric for the table category using characteristics of the multiple tables; and
   defining one or more threshold values associated with the metric for characterizing the table category, wherein the metric is determined using at least one of characteristics of a table comprising:
   a read access rate;
   insert, delete and update rates;
   a number of records;
   a number of columns;
   a number of primary key and foreign key relationships;
   a volume throughput for an extraction, transformation, and loading (ETL) process;
   a timestamp value; and
   an assigned trigger type.

* * * * *